United States Patent Office 3,299,000
Patented Jan. 17, 1967

3,299,000
POLYCARBONATES FROM SUBSTITUTED 4,4'-(CYCLOHEXYLMETHYLENE)BIS(2,6-DICHLOROPHENOLS)
Winston J. Jackson, Jr., and John R. Caldwell, Kingsport, Tenn., assignors to Eastman Kodak Company, Rochester, N.Y., a corporation of New Jersey
No Drawing. Filed Jan. 7, 1964, Ser. No. 336,133
7 Claims. (Cl. 260—47)

This application is a continuation-in-part of Jackson and Caldwell U.S. Serial No. 137,972, filed September 14, 1962, and now U.S. Patent 3,220,977, patented November 30, 1965.

The present invention relates to new polymers having unusually high second order transition and heat-distortion temperatures as well as other desirable properties. More particularly, the invention concerns new polycarbonates and the monomers for preparing the same.

In the field of polymer chemistry, the search for polymers having better resistance to deformation under the influence of heat is continuous. The demand for such materials resides, for example, in the film, fiber-forming and molding fields. Polymers which have been found useful for high-temperature applications are the linear polycarbonates of 4,4'-(cyclohexylmethylene)diphenols. These polymers prepared through the reaction of the diphenols with phosgene or a bischloroformate exhibit high melting points and good solubility in such film-casting solvents as methylene chloride. Exemplary of these polymers are:

(1) The polymeric reaction product of 4,4'-(cyclohexylmethylene)diphenol and phosgene melting at 300° C. and having a second order transition temperature of 190° C.;

(2) The polymeric reaction product of 4,4'-(1-methylcyclohexylmethylene)diphenol and phosgene, softening at 300–310° C.;

(3) The polymeric reaction product of 4,4'-(2-methylcyclohexylmethylene)diphenol and phosgene, softening at 260–280° C.;

(4) The polymeric reaction product of 4,4'-(2-phenylcyclohexylmethylene)diphenol and phosgene, softening at 250–265° C.; and (5) The polymeric reaction product of 4,4'-(cyclohexylmethylene)diphenol and 2,5-norcamphanediol bischloroformate, softening at 280–295° C.

Although these polymers represent improvements in high temperature-resistant plastics, improved deformation resistance and resistance to burning are continually sought for such applications as protective clothing, electrical insulation, capacitor dielectrics, packaging materials, protective coatings, and molded objects of various types.

Objects of the present invention, therefore, are: to provide film, fiber and molding polymers which have considerably improved resistance to high-temperature deformation; to provide these polymers in the form of polycarbonates; and to provide monomeric materials useful in their preparation.

These and other objects hereinafter becoming apparent have been achieved according to the present invention through the discovery that the 2,6-chlorination of the phenol groups of the monomers employed in the above polymers (1) through (5) and other polymers hereinafter disclosed, results in very substantial improvements in the resistance of the polymers to heat deformation. Moreover, it has been found that such modification does not adversely affect processability, I.V., tensile strength, modulus, elongation, solubility in relatively low-boiling solvents, and other properties so desirable for film, fiber, and molding polymers.

The unexpectedness of the results achieved through the use of such chlorine-containing diphenols resides in part in the prior-art teaching that the second-order transition temperature of the polycarbonate of 4,4'-cyclohexylidenebis(2,6-dichlorophenol)

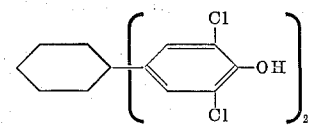

is 163° C. [Schnell, Ind. Eng. Chem., 151, 158 (1959)], is 12° C. lower than that of the unchlorinated bisphenol. The second-order transition temperature of our similar polycarbonate from 4,4'-(cyclohexylmethylene)bis(2,6-dichlorophenol),

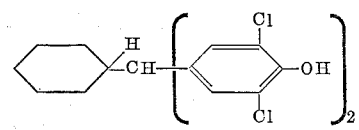

on the other hand, is 256° C., which is 66° C. higher than that of the unchlorinated bisphenol. Polycarbonates from substituted cyclohexylmethylenebis(2,6-dichlorophenols), described hereinafter, also have unexpectedly high second-order transition temperatures. The importance of the second-order transition temperature is the fact that this is the lowest temperature at which the polymer chains of noncrystalline polymers, such as these polycarbonates, can move measurably. The second-order transition temperature of these polymers, therefore, is the highest practical-use temperature of the polymers. These polymers have higher second-order transition temperatures than have ever been reported for polycarbonates containing aliphatic or monocyclic groups. The 4,4'-(cyclohexylmethylene)bis[2,6-dichlorophenols] employed in the present invention may be prepared according to the following reaction series:

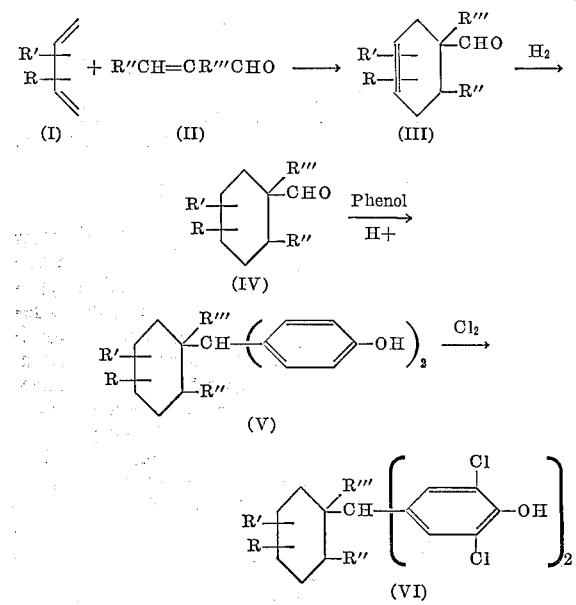

wherein R and R' may be the same or different and are selected from the group consisting of hydrogen, methyl, ethyl, propyl, and butyl groups and chlorine atoms, R" is selected from the group consisting of methyl, ethyl, propyl, butyl, and phenyl groups and a hydrogen atom, and R''' is selected from the group consisting of methyl, ethyl, propyl, and butyl groups and a hydrogen atom. Alkyl groups or chlorine atoms (R and R') may be introduced on the cyclohexane ring by starting with the appropriately substituted diene (I). Specific diene reactants useful in this synthesis include butadiene, 2,3-dimethylbutadiene, 2-ethylbutadiene, 2-chlorobutadiene, 1-methylbutadiene, and 2-butylbutadiene.

The $\alpha$-$\beta$-unsaturated aldehydes (II) useful in this synthesis include acrolein, methacrolein, crotonaldehyde, cinnamaldehyde, p-chlorocinnamaldehyde, and 4-ethylcrotonaldehyde.

In the above synthesis the diene and aldehyde reactants are reacted to give the cyclic aldehyde according to a conventional Diels-Alder reaction, such as described in J. Chem. Soc., 739 (1949); J. Am. Chem. Soc., 73, 57 (1951); or Chem. Abstr., 32, 7906a (1938).

The hydrogenation of the cyclic aldehyde (III) may be accomplished, for example, by subjecting it at room temperature in an autoclave to hydrogen at about 500 p.s.i., in the presence of a 5% palladium on alumina catalyst. Such a procedure is also described in J. Chem. Soc. 739 (1949).

These saturated aldehydes (IV) may also be prepared by hydroformylating cyclohexene having the particular R, R', R'', and R''' substituents. This reaction is carried out in an autoclave at 100-200° C. in the presence of a conventional oxo catalyst, such as dicobalt octacarbonyl. A similar procedure is described in U.S. Patent 2,437,600. The reaction is applicable to cyclohexene, 1-methyl-1-cyclohexene, 1-ethyl-2-cyclohexene, 1-phenyl-3-cyclohexene, 1,4-dimethyl-2-cyclohexene, and similar compounds.

The saturated aldehyde (IV) is then reacted with phenol at room temperature in an acid medium such as concentrated HCl (preferred), $H_2SO_4$, toluene sulfonic acid, and methanedisulfonic acid to form the bisphenol compound (V). To avoid trisphenol formation, at least 4 moles of phenol is used per mole of aldehyde. The bisphenol compound is then chlorinated by introducing chlorine into a slurry thereof with acetic acid, tetrachloroethane, or other relatively inert chlorination medium, at 20–80° C. and preferably at 40–50° C. The amount of chlorine added may be followed by continuously weighing the chlorine cylinder as the chlorine is bubbled into the stirred mixture. As the bisphenol compound becomes chlorinated, it goes into solution. It may be precipitated by pouring the solution into ice water. The product may be purified by repeatedly dissolving it in aqueous acetic acid and reprecipitating therefrom, or by recrystallizing from aqueous acetic acid.

POLYMER PREPARATION

The preferred method for preparing the polycarbonates is to add phosgene and/or a bischloroformate to the bisphenol compound (VI) in a tertiary amine, such as pyridine or triethylamine. Some of the amine may be replaced by a solvent for the polycarbonate, such as methylene chloride or ethylene dichloride. Usually it is necessary to add slightly over the theoretical amount of phosgene or phosgene plus bischloroformate, depending upon the amount of moisture in the system. The polymerizations are carried out at 0–50° C. and preferably at 20–30° C. Buildup of the polymer is indicated by an increase in viscosity of the amine solution. At the completion of the polymerization, the solution is poured into water which dissolves the amine hydrochloride and the excess amines. If no other solvent such as methylene chloride is present, the polymer precipitates. Better washing can be obtained if a water-immiscible solvent such as methylene chloride is present with the tertiary amine. The polymer then can be thoroughly washed with water and precipitated by adding the solution to hexane, methanol, or other nonsolvent.

These polycarbonates can also be prepared by adding phosgene and/or a bischloroformate to a stirred aqueous mixture containing sodium hydroxide, the bisphenol compound, a catalyst, and methylene chloride. On further stirring the polymer builds up in the methylene chloride phase. This process has been described by Schnell in Ind. Eng. Chem., 51, 158 (1959). See also Angew. Chem., 68, 633 (1956). When a bischloroformate is added, the molar amount of the bisphenol compound preferably should be equal or in about 5 mole percent excess. When phosgene is added, it should preferably be 5 to 10 mole percent in exess relative to the bisphenol compound. The same applies if phosgene and a bischloroformate are both added.

Copolymers are obtained if two bisphenol compounds are used or if a bischloroformate is added in addition to the phosgene. Since the homopolymers of this invention have very high melting points, above 300° C., they are difficult to injection-mold. Copolymers with lower melting points can be prepared which are more suitable for injection-molding. The homopolymers, however, can be cast into films and wet-spun or dry-spun into fibers.

It is noted that a great variety of well known condensable diols may be employed along with the present diols to obtain polymers having an almost infinite variety of properties. The amounts of such other diols which may be employed can widely vary depending upon the properties desired, but below about 60% thereof in the diol component is preferred.

The bisphenol compounds of the present invention may be represented by the formula HO—X—OH wherein X is the nucleus, and when reacted with phosgene give recurring structural units in the polymer of

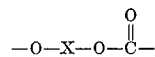

On the other hand, their reaction with a bischloroformate of nucleus Y, gives the repeating unit

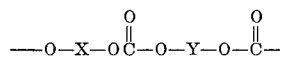

The diol from which the bischloroformate is prepared may be aliphatic, aliphatic ether, alicyclic or aromatic, and primary, secondary, or tertiary. The aliphatic, aliphatic ether, and alicyclic diols are preferred. The aliphatic portion may be straight or branched and may contain from 2 to 20 carbon atoms. Particularly useful bischloroformates are those prepared from hydroxy-terminated poly(tetramethylene oxide) of molecular weights of about about 1000. Examples of diols are 1,6-hexanediol; 1,4-cyclohexandimethanol; p-xylylenediol; 2,5-norcamphane diol; quinitol; and 2,5-dimethyl-2,5-hexandiol. Also, one or more groups such as —$R_2C$—, —O—, —$OCH_2CH_2O$—, —S—, —SO—, —$SO_2$—, —$SO_2NR$—, —NR—, —CONH—, —CO—, —COO—, —$CF_2$—, —NRNR—, —CH=CH, —C≡C, phenylene and cyclohexylene, wherein R=alkyl or aryl, may be contained in the bischloroformate. The bischloroformates are prepared by adding an excess of phosgene to the diol suspended in ethylene dichloride. If the diol reacts very slowly, a little dry dioxane is also added to increase its solubility in the medium. When all of the diol has gone into solution, dry air is bubbled in until all hydrogen chloride and excess phosgene have been swept out. The bischloroformate solution may then be used as needed in the polymerization reactions.

BISPHENOL COMPOUND PREPARATION

*Example 1.—4,4′(Cyclohexylmethylene)bis[2,6-dichlorophenol]*

A. Cyclohexanecarboxaldehyde was prepared by hydroformylating cyclohexene by a procedure similar to that described in U.S. Patent 2,437,600. This aldehyde also may be prepared by the Diels-Alder reaction between butadiene and acrolein [Ann., 460, 121 (1958)] followed by hydrogenation of the double bond in the adduct [J. Chem. Soc., 739 (1949)].

B. 4,4′-(cyclohexylmethylene)diphenol was then prepared by adding 124 g. (1.0 mole) of cyclohexanecarboxaldehyde to a mixture of 376 g. (4.0 moles) of phenol and 250 g. of concentrated hydrochloric acid while stirring. The reaction was exothermic, and the temperature rose to 75° C. Stirring was continued 8 hours longer. The acid layer was then decanted, and the remaining mixture was stirred for 1 hour with 250 ml. of benzene, filtered, and thoroughly washed with benzene and water. The crude product, after drying consisted of 207 g. of a pink powder, M.P. 216–219° C. Recrystallized from acetic acid, it melted at 223–224° C.

Analysis.—Calcd. for $C_{19}H_{22}O_2$: C, 51.1; H, 7.8. Found: C, 51.0; H, 7.9.

C. 4,4' - (cyclohexylmethylene)bis[2,6-dichlorophenol] was then prepared by adding 32 g. (0.45 mole) of chlorine with stirring to 28.2 g. (0.10 mole) of 4,4'-(cyclohexylmethylene)-diphenol in 100 ml. of acetic acid at 45–50° C. The chlorine was measured as the weight loss of a lecture bottle. The bisphenol compound went into solution as it reacted. When the acetic acid solution was poured into ice water, the product precipitated. After two recrystallizations from aqueous acetic acid, 26 g. (62% yield) was obtained and melted at 147–149° C.

Analysis.—Calcd. for $C_{19}H_1Cl_4O_2$: Cl, 33.8. Found: Cl, 33.5.

*Example 2.—4,4-(1-methylcyclohexylmethylene)bis [2,6-dichlorophenol]*

1-methyl-3-cyclohexene-1-carboxaldehyde was prepared from butadiene and methacrolein by the procedure in J. Am. Chem. Soc., 73, 57 (1951). The double bond was then reduced at room temperature with hydrogen at 500 p.s.i., using 5% palladium on alumina catalyst. The saturated aldehyde, 1-methylcyclohexanecarboxaldeyhde, distilled at 93–97° C./100 mm. 4,4'-(1-methylcyclohexylmethylene)dihpenol was prepared from the saturated aldehyde and phenol by the procedure of Example 1. Colorless prisms obtained from acetic acid melted at 183–184° C. This compound was chlorinated by the procedure of Example 1 to yield 4,4'-(1-methylcyclohexylmethylene)bis[2,6-dichlorophenol]. After recrystallization from aqueous acetic acid it gave a correct analysis for 4 chlorine atoms for molecule.

*Example 3.—4,4'-(2-methylcyclohexylmethylene)bis [2,6-dichlorophenol]*

6-methyl-3-cyclohexene-1-carboxaldehyde was prepared from butadiene and crotonaldehyde according to the procedure in Chem. Abstracts, 32, 7906a (1938). Palladium catalyst (5% on alumina) was then added to the crude product, and the double bond was hydrogenated at 500 p.s.i. and room temperature. The saturated aldehyde, 2-methylcyclohexanecarboxaldehyde, distilled at 81–82° C./39 mm. 4,4' - (2-methylcyclohexylmethylene)-diphenol was prepared from the saturated aldehyde and phenol by the procedure of Example 1. It crystallized as a hydrate from aqueous acetic acid and melted at 207-209° C. after loss of the water. This compound was chlorinated by the procedure of Example 1 to yield 4,4'-(2-methylcyclohexylmethylene)bis-[2,6-dichlorophenol]. After recrystallization from aqueous acetic acid it melted at 162–165° C. and gave a correct analysis for 4 chlorine atoms per molecule.

*Example 4.—4,4'-(2-phenylcyclohexylmethylene)bis[2,6-dichlorophenol]*

6 - phenyl - 3 - cyclohexene - 1 - carboxaldehyde was prepared by heating 2.0 moles of butadiene with 1.5 moles of cinnamaldehyde in an autoclave at 170° C. for 3 hours. Five grams of 5% palladium on alumina was then added, and the double bond was hydrogenated at 500 p.s.i. and room temperature. The saturated aldehyde, 2-phenylcyclohexanecarboxaldehyde, distilled at 101–103° C./1 mm. 4,4'-(2-phenylcyclohexylmethylene)diphenol was prepared from the saturated aldehyde and phenol by the procedure of Example 1. After recrystallization from aqueous acetic acid and then ethylene dichloride, it melted at 174–176° C. This compound was chlorinated by the procedure of Example 1 to yield 4,4' - (2 - phenylcyclohexylmethylene)bis[2,6 - dichlorophenol].

POLYMER PREPARATION

In the following specific examples, all of the polycarbonates described, except the elastomer in Example 10, gave self-extinguishing fibers which stopped burning immediately, without dripping, when removed from a flame. All inherent viscosities were determined in chloroform. The tensile properties of the films were determined according to ASTM D882–56T Method A. The heat-distortion temperatures were measured in a forced convection oven as described by Watson, Armstrong, and Kennedy in Modern Plastics, 34, (No. 3), 169 (1956). The second-order transition temperatures were taken as the temperatures at which the films distorted ¼% at a load of 5 p.s.i. when heated in the above oven. By this method second-order transition temperatures similar to those in the literature [Schnell, Ind. Eng. Chem., 51, 158 (1959)] were obtained for known polycarbonates, such as those from 4,4' - isopropylidenediphenol and 4,4'-cyclohexylidenediphenol.

*Example 5.—Preparation of a polycarbonate from 4,4'-(cyclohexylmethylene)bis[2,6-dichlorophenol]*

Phosgene was added to a solution containing 10.5 g. (0.025 mole) of the bisphenol compound, 15 ml. of distilled pyridine, and 60 ml. of methylene chloride until the mixture became very viscous. This required 2.7 g., measured as the weight loss of the lecture bottle. The temperature was held at about 25° C. with a water bath. More methylene chloride (50 ml.) and phosgene (0.1 g.) were added, and the viscous mixture was stirred for 10 minutes. It was then poured into water. The organic layer was diluted with more methylene chloride, washed several times with water, and then added to hexane to precipitate the polymer as a white, fibrous product. It had an inherent viscosity of 1.00. A film cast from methylene dichloride had the following properties: tensile strength=13,500 p.s.i., modulus=$3.7 \times 10^5$ p.s.i., elongation=5.9%, second-order transition temperature=256° C., and heat-distortion temperature (2% extension) at 50 p.s.i.=285° C. As has been pointed out, the unchlorinated bisphenol gave a polymer with a second-order transition temperature of only 190° C.

*Example 6*

The procedure of Example 5 was used for preparing the polycarbonate of 4,4' - (1 - methylcyclohexylmethylene)bis - [2,6 - dichlorophenol]. It was obtained with an inherent viscosity of 0.73. A film cast from methylene chloride had the following properties: tensile strength=11,300 p.s.i., modulus=$3.9 \times 10^5$ p.s.i., elongation=6.3%, second-order transition temperature=235° C., and heat-distortion temperature=260° C. In comparison, the unchlorinated bisphenol gave a polymer with a second-order transition temperature of only 171° C.

*Example 7*

The procedure of Example 5 was used for preparing the polycarbonate of 4,4' - (2 - methylcyclohexylmethylene)bis - [2,6 - dichlorophenol]. It had an inherent viscosity of 0.92. A film cast from methylene chloride had the following properties: tensile strength=12,200 p.s.i., modulus=$4.1 \times 10^5$ p.s.i., elongation=6.8%, second-order transition temperature=250° C., and heat-distortion temperature=280° C. In comparison, the unchlorinated bisphenol gave a polymer with a second-order transition temperature of only 195° C.

Example 8

The procedure of Example 5 was used for preparing the polycarbonate of 4,4' - (2 - phenylcyclohexylmethylene)bis - [2,6 - dichlorophenol]. It had an inherent viscosity of 0.56. A film cast from methylene chloride had the following properties: tensile strength=10,400 p.s.i., modulus=$4.5 \times 10^5$ p.s.i., elongation=4.9%, second-order transition temperature=242° C., and heat-distortion temperature=250° C.

Example 9

A copolymer was prepared from 0.0125 mole of 4,4'-(cyclohexylmethylene)bis[2,6-dichlorophenol] and 0.0125 mole of 4,4' - isopropylidenediphenol by the method of Example 5. It had an inherent viscosity of 1.27 and could be injection-molded to give a fireproof plastic. The injection-molded product had a tensile strength of 11,600 p.s.i., an elongation of 15%, and a heat-distortion temperature of 200° C.

Example 10

An elastomer was prepared from 0.025 mole of 4,4'-(cyclohexylmethylene)bis[2,6 - dichlorophenol] and 16 g. of the bischloroformate of hydroxy-terminated poly(tetramethylene oxide) of molecular weight 3000. The general method of Example 5 was used. After addition of a solution of the bischloroformate in 20 ml. of ethylene dichloride, the polymerization was completed by the addition of 2.3 g. of phogene. The polymer had an inherent viscosity of 1.83, and good elastomeric properties. It melted at 180° C.

The invention has been described in detail with particular reference to preferred embodiments thereof, but it will be understood that variations and modifications can be effected within the spirit and scope of the invention as described hereinabove and as defined in the appended claims.

We claim:

1. The polymer consisting essentially of the recurring structural unit

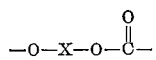

wherein X is a bivalent group having the formula

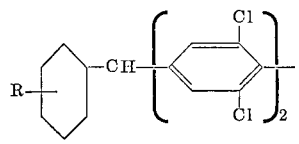

wherein R is at least one methyl, ethyl, propyl, butyl or phenyl group.

2. The polymer consisting essentially of the recurring structural unit

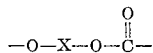

wherein X is 4,4' - (1 - methylcyclohexylmethylene)-bis[2,6-dichlorophenyl].

3. The polymer consisting essentially of the recurring structural unit

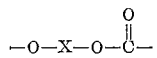

wherein X is 4,4' - (2-methylcyclohexylmethylene)-bis[2,6-dichlorophenyl].

4. The polymer consisting essentially of the recurring structural unit

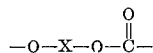

wherein X is 4,4' - (2-methylcyclohexylmethylene)-bis[2,6-dichlorophenyl].

5. A fiber comprised of the polymer of claim 1.
6. A film comprised of the polymer of claim 1.
7. A molded article comprised of the polymer of claim 1.

References Cited by the Examiner
UNITED STATES PATENTS

| | | | |
|---|---|---|---|
| 3,062,781 | 11/1962 | Bottenbruch et al. | 260—47 |
| 3,146,273 | 8/1964 | Orloff et al. | 260—619 |
| 3,153,008 | 10/1964 | Fox | 260—47 |
| 3,161,615 | 12/1964 | Goldberg | 260—47 |
| 3,182,088 | 5/1965 | Hennis | 260—619 |
| 3,220,975 | 11/1965 | Fox | 260—47 |

SAMUEL H. BLECH, *Primary Examiner.*